(12) United States Patent
Kniffin et al.

(10) Patent No.: US 10,012,864 B2
(45) Date of Patent: Jul. 3, 2018

(54) APPARATUS, SYSTEM, AND METHOD FOR DEVELOPING PHOTOS FROM DIGITAL IMAGES

(71) Applicants: Travis Kniffin, Wayne, PA (US); Joshua Hopkins, Wayne, PA (US)

(72) Inventors: Travis Kniffin, Wayne, PA (US); Joshua Hopkins, Wayne, PA (US)

(*) Notice: Subject to any disclaimer, the term of this patent is extended or adjusted under 35 U.S.C. 154(b) by 0 days.

(21) Appl. No.: 15/098,887

(22) Filed: Apr. 14, 2016

(65) Prior Publication Data

US 2016/0306263 A1 Oct. 20, 2016

Related U.S. Application Data

(60) Provisional application No. 62/148,808, filed on Apr. 17, 2015.

(51) Int. Cl.
| | |
|---|---|
| *G03B 17/48* | (2006.01) |
| *G02F 1/1335* | (2006.01) |
| *H04N 5/235* | (2006.01) |
| *G03B 17/26* | (2006.01) |
| *G03B 27/04* | (2006.01) |

(52) U.S. Cl.
CPC ....... *G02F 1/133553* (2013.01); *G03B 27/04* (2013.01); *G03B 17/26* (2013.01)

(58) Field of Classification Search
CPC ......... G02F 1/133553; G02F 1/133509; G03B 27/04; G03B 17/26; G03B 17/48; H04N 5/2353
See application file for complete search history.

(56) References Cited

U.S. PATENT DOCUMENTS

| | | | |
|---|---|---|---|
| 3,644,036 A | 2/1972 | Canfield | |
| 4,847,632 A * | 7/1989 | Norris | B41J 29/026 346/134 |
| 5,018,084 A | 5/1991 | Frank | |

(Continued)

FOREIGN PATENT DOCUMENTS

| | | |
|---|---|---|
| CN | 100485521 C | 5/2009 |
| CN | 102621798 B | 3/2014 |

OTHER PUBLICATIONS

Darkroom printing with projector as enlarger, posted on http://photo.net/digital-darkroom-forum/00VLnq, Corey Narsted, Dec 27, 2009; 07:43 p.m.

(Continued)

*Primary Examiner* — Tracie Y Green
(74) *Attorney, Agent, or Firm* — Duane Morris LLP (57) ABSTRACT

An apparatus for developing a photographic image includes a housing, a light source and a liquid crystal display (LCD) panel. The light source is disposed on a first wall of or inside the housing and configured to emit light inside the housing. The LCD panel having a front side and a back side is disposed on a second wall or inside the housing. The LCD panel is configured to display a digital image on the front side upon illumination of the light toward the back side and to expose a photographic media disposed in close proximity to or contacting the front side of the LCD panel. A method for developing a photographic image is also provided. The photographic media can be developed into a photographic image after exposure using the LCD panel.

22 Claims, 5 Drawing Sheets

(56) References Cited

U.S. PATENT DOCUMENTS

| | | | |
|---|---|---|---|
| 5,023,652 A | 6/1991 | Purro | |
| 5,488,450 A * | 1/1996 | Tanibata | G03B 27/725 |
| | | | 355/38 |
| 5,994,039 A | 11/1999 | Fitterman et al. | |
| 6,016,157 A | 1/2000 | Stephenson | |
| 6,222,612 B1 * | 4/2001 | Kluter | G03B 15/003 |
| | | | 355/27 |
| 6,288,788 B1 | 9/2001 | Stephenson et al. | |
| 6,341,008 B1 * | 1/2002 | Kraft | G02F 1/1345 |
| | | | 349/149 |
| 6,741,325 B2 | 5/2004 | Yamamoto | |
| 2002/0135795 A1 * | 9/2002 | Kwok | B41J 2/465 |
| | | | 358/1.15 |
| 2005/0141084 A1 | 6/2005 | Waters | |
| 2016/0125923 A1 | 5/2016 | Israel et al. | |

OTHER PUBLICATIONS

Enfojer project turns your smartphone into an enlarger for B&W prints, http://connect.dpreview.com/post/5297127597/enfojer-project-aims-to-create-smartphone-enlarger-for-b-w-prints, published Sep. 8, 2013.

\* cited by examiner

APPARATUS, SYSTEM, AND METHOD FOR DEVELOPING PHOTOS FROM DIGITAL IMAGES

PRIORITY CLAIM AND CROSS-REFERENCE

This application claims the benefit of U.S. Provisional Application No. 62/148,808, filed Apr. 17, 2015, which application is expressly incorporated by reference herein in its entirety.

FIELD OF THE INVENTION

The present disclosure relates to photography. More particularly, the disclosed subject matter relates to an apparatus, a system, and a method for developing photos from digital images.

BACKGROUND

Photographic processing or developing is generally performed through chemical means by which a photographic film or a paper is treated after photographic exposure to produce a negative or positive image. Photographic processing transforms the latent image into a visible image or photo in a stable form, which is insensitive to light. Both black-and-white and color photos can be developed by chemical methods. For example, a negative can be obtained through photographic exposure on a photographic film such as a silver halide film and subsequent chemical treatment. A photo can be further developed or printed onto a photographic paper in a dark room.

In most darkrooms, an enlarger, an optical projector, and a control of light are used. A negative is placed in the enlarger. An image from the negative is enlarged and projected onto a photographic paper. The control is used to focus the enlarged image on the photographic paper, and adjust the intensity and duration of light exposure. The exposed paper is further developed through wet processes using developer and fixing agents.

When developing black-and-white prints, a safelight is commonly used to illuminate the work area. The majority of black-and-white papers are sensitive to only blue, or to blue and green light, so a red- or amber-colored light can be safely used without exposing the paper. However, color photographic papers, being sensitive to all parts of the visible spectrum, must be kept in complete darkness until the prints are properly fixed.

SUMMARY OF THE INVENTION

The present disclosure provides an apparatus, a system and a method for developing a photo from a digital image, and methods of making the apparatus and the system.

In some embodiments, an apparatus for developing a photographic image comprises a housing, a light source and a liquid crystal display (LCD) panel. The light source is disposed on a first wall of or inside the housing and configured to emit light to inside the housing. The LCD panel having a front side and a back side is disposed on a second wall or inside the housing. The LCD panel is configured to display a digital image on the front side upon illumination of the light toward the back side and to expose a photographic media disposed in close proximity to or contacting the front side of the LCD panel.

In some embodiments, the apparatus further comprises a filter slot for an optical filter disposed between the light source and the LCD panel. The optical filter is configured to filter out unwanted wavelength and provide a pre-determined range of wavelength of the light. In some embodiments, the apparatus also comprises a mirror, which is placed inside the housing and optically between the light source and the LCD panel. The mirror is configured to reflect the light from the light source to the back side of the LCD panel. In some embodiments, the photographic media is one of a photographic paper and an instant photographic film. In some embodiments, a plate is mechanically connected on the housing. Such a plate is configured to press the photographic media against the front side of the LCD panel. For example, the photographic media is a photographic paper directly contacting the front side of the LCD panel. In some embodiments, the apparatus can comprise a slot on the second wall of the housing. The slot is configured to install an instant photographic film pack on the front side of the LCD panel. A computer can be also disposed on one wall of or outside the housing, and connected with the LCD panel. The computer is configured to display, process and provide a digital image to the LCD panel. A user can access to the computer to input and edit a digital image.

In some embodiments, an apparatus for developing a photographic image comprises a housing, a light source, a liquid crystal display (LCD) panel, a filter slot for an optical filter, and a mirror. The housing has a first wall, a second wall, and a bottom wall. The first wall and the second wall are two slanted side walls facing each other. The light source is disposed on the first wall of or inside the housing and configured to emit light to inside the housing. The LCD panel having a front side and a back side is disposed on the second wall the housing. The LCD panel is configured to display a digital image on the front side upon illumination of the light toward the back side. The LCD panel is also configured to expose a photographic media disposed in close proximity to or contacting the front side of the LCD panel. The filter slot for an optical filter disposed between the light source and the LCD panel, the optical filter configured to filter out unwanted wavelength and provide a pre-determined range of wavelength of the light. The mirror is placed inside the housing, and optically between the light source and the LCD panel. For example, the mirror is disposed over or on the bottom wall of the housing. Such a mirror is configured to reflect the light from the light source to the back side of the LCD panel.

The apparatus can further comprise a computer disposed on one wall of or outside the housing, and connected with the LCD panel. The computer is configured to display, process and provide a digital image to the LCD panel. In some embodiments, the photographic media is one of a photographic paper and an instant photographic film. A plate can be mechanically connected on the housing, and is configured to press the photographic media against the front side of the LCD panel. The photographic media can be a photographic paper directly contacting the front side of the LCD panel. In some embodiments, a slot is disposed on the second wall of the housing and is configured to install an instant photographic film pack on the front side of the LCD panel. In some embodiments, at least one control is connected to at least one of the light source and the LCD panel. The at least one control is used to adjust one of an intensity of the light and a time period of exposure.

In some embodiments, the light source, the mirror, and the LCD panel are configured so that light beams from the light source at different angles have substantially identical optical pathways from the light source to the back side of the LCD panel.

In another aspect, a method of developing a photo from a digital image on a LCD panel is provided. Such a method comprises the steps of providing light from a light source to illuminate a back side of a liquid crystal display (LCD) panel, providing signals for a digital image to be displayed on a front side of the LCD panel, and exposing a photographic media disposed in close proximity to or contacting the front side of the LCD panel. In some embodiments, the method comprises editing the digital image on a computer connected with the LCD panel before the step of providing signals for the digital image to be displayed on the front side of the LCD panel. An optical filer can be used to filter out unwanted wavelength to provide a pre-determined range of wavelength of the light. The optical filter can be disposed between the light source and the LCD panel. Such a method can also comprise reflecting the light to the back side of the LCD panel using a mirror placed optically between the light source and the LCD panel.

In some embodiments, at least one control is used to adjust one of an intensity of the light and a time period of exposure. The photographic media can be one of a photographic paper and an instant photographic film. In some embodiments, the photographic media directly contacts the front side of the LCD panel.

After the step of exposing a photographic media disposed in close proximity to or contacting the front side of the LCD panel, the photographic image can be developed on the photographic media chemically. For example, the step of developing the photographic image on the photographic media chemically is performed using a developer and a fixer in a dark room in some embodiments.

The present disclosure also provides the system for develop a photographic image. The system comprises the apparatus as described.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion. Like reference numerals denote like features throughout specification and drawings.

DETAILED DESCRIPTION

The following disclosure provides many different embodiments, or examples, for implementing different features of the invention. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

The present disclosure provides an apparatus, a system and a method for developing a photo from a digital image, and methods of making the apparatus and the system.

In such an apparatus, a system and a method, a liquid crystal panel (LCD) displaying a digital photo is used to expose a photographic media such as a silver halide based photographic paper or any light sensitive image media. Such a photographic exposure device uses a liquid crystal display as a means to present and translate an image via light exposure to a photographic media. The exposed photographic media can be further developed through chemical development processing to form a photographic image (i.e. a photo) embodied on such photographic media. For example, such a development can be performed in dark rooms in some embodiments. Such an apparatus, a system and a method provided in the present disclosure can eliminate the needs for a negative film, an enlarger and an optical projector, or the like. Unlike a negative film limited to a certain size, the image displayed on a LCD panel is not limited to any size in the method provided in the present disclosure.

The method also integrates processes from both chemical photo development and digital image capture, digital editing and presentation techniques. The apparatus can be used to present a photographic digital file onto silver-halogen based photographic media. Before this invention, there has not been any sufficient method for imparting the digital image into a print that uses the same light sensitive measures as the traditional analog process. This apparatus or device is designed for the digital photographer to benefit silver based printed media aesthetically, technically, and ergonomically, while still showing digital image capture. Such a method also provides uniform and consistent light exposure that is currently truncated for the digital image-maker due to nearly exclusive control of the printed media by ink application methods. By using the apparatus, system and method provided in the present disclosure, resulting photographic images have excellent quality and aesthetical effect.

The apparatus, the system and the method also provide other advantages. For example, unlike in an existing apparatus with an enlarger, no f-stop control is needed in some embodiments. Lacking f-stop control refers to absence of a diaphragm to control intensity. In an existing apparatus with an enlarger, an aperture diaphragm is necessary to control the depth of field of the projected image to offset alignment discrepancies, as well as control light intensity to help adjust exposures if they are too long or short. The f-stop is a variable number setting on the diaphragm. Although optically speaking all exposure units contain a method of light control, in some embodiments, the apparatus provided in the present disclosure does not need any variable aperture, and the light intensity is controlled without using a diaphragm. Depth of field is fixed in the apparatus due to the nature of the contact process, and the need for depth of field control is eliminated in some embodiments.

For brevity, unless expressly indicated otherwise, references to "a photographic media" made in this application will be understood to encompass any suitable photosensitive media including but are not limited to a photographic paper and an instant photographic film or paper. Such a photographic paper or instant photographic film (or paper) may comprise silver halide or silver-gelatin based chemical compositions. References to "a photo" made in this application will be understood to encompass a photographic image embodied or printed on a suitable media such as a paper, a photographic paper or instant photographic film or paper, and the like. References to "an apparatus" can be exchangeable to other terms such as "a device" and "a machine."

In FIGS. 1-4, like items are indicated by like reference numerals, and for brevity, descriptions of the structure, provided above with references to the preceding figures, are not repeated. The method described in FIG. 5 is described with reference to the exemplary structure described in FIGS. 1-4.

Figure 1:
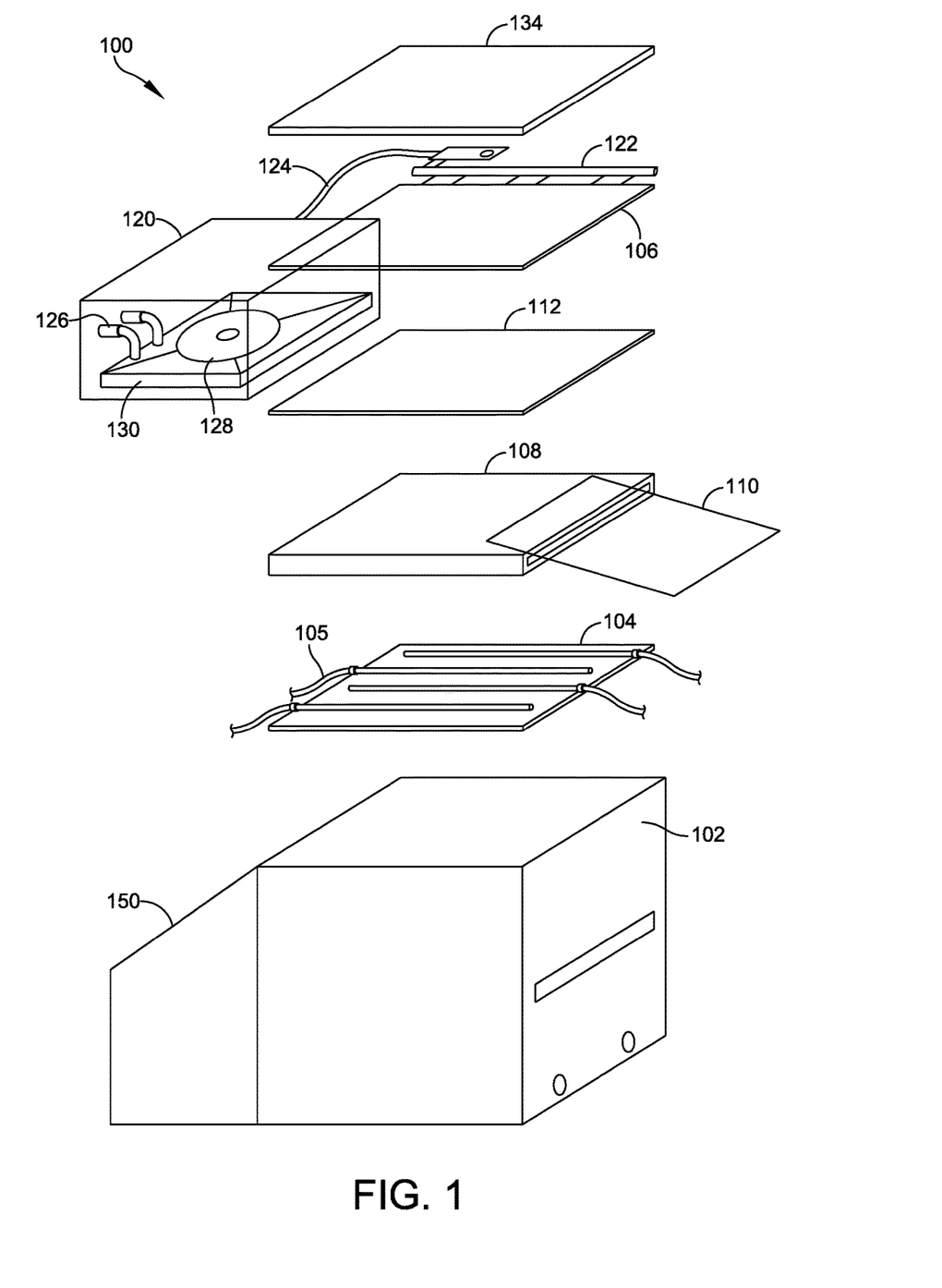
FIG. 1 is a perspective exploded view of an exemplary apparatus for developing a photo from a digital image on a LCD panel in accordance with some embodiments.

Referring to FIG. 1, an exemplary apparatus 100 for developing a photo from a digital image is provided in accordance with some embodiments. Apparatus 100 comprises a housing 102, a light source 104 and a liquid crystal display (LCD) panel 106. Light source 104 is disposed on inside housing 102 and configured to emit light to inside housing 102. Light source 104 can be any suitable source including but are not limited to a light bulb or a light emitting diode (LED) array. For example, light source 104 comprises a LED array in some embodiments as shown in FIG. 1. Light source 104 with a LED array is connected with a power source (not shown) through wires 105. LCD panel 106 can be also disposed inside housing 102. Light from light source 104 illuminates LCD panel 106 from its back side. LCD panel 106 is configured to display a digital image on the front side (opposite side of light source 104) upon illumination of the light toward the back side and to expose a photographic media disposed in close proximity to the front side of LCD panel 106. Unless expressly indicated otherwise, references to "in close proximity to" made in the present disclosure is understood to mean that the photographic media is disposed near or close to the front side of LCP panel 106 so that the digital image from the LCD panel 106 can be clearly exposed to the photographic media. The photographic media may be within a certain distance (e.g., less than 1 cm or 0.5 cm) from the LCD panel 106, or may be almost touching or touching the LCD panel 106. For example, the photographic media (not shown) is disposed on the top (the front side) of LCD panel 106 and can be pressed by a plate 134.

In some embodiments, apparatus 100 further comprises a filter slot 108 for an optical filter 110 disposed between light source 104 and LCD panel 106. Optical filter 110 is configured to filter out unwanted wavelength and provide a pre-determined range of wavelength of the light. The pre-determined range of wavelength can be of any suitable color range. Optical filter 110 can be any suitable filter, including but are not limited to, a polycarbonate dye filter and a colored gel filter. Optical filter 110 is used to limit the spectrum transmitted by the light source 104 in order to control the range of tones to be recorded on a photographic paper. Optical filter 110 be used in conjunction with variable contrast paper, and can be of different sizes. In some embodiments, a diffusion plate 112 for diffusing the light from light source 104 can be optionally used. Variable contrast paper is an advanced type of photographic paper to allow the density range of the paper to be adjusted to fit that of the negative image (or the digital image on LCD panel). If such an image has high contrast, the use of the right filter may activate a low contrast emulsion in the variable contrast photo paper in order to give a normal ranged print. Variable contrast paper contains two emulsions that are sensitive to different wavelength ranges of light. The high contrast photo emulsion is sensitive to blue light and thus a magenta filter will pass blue light while blocking green. The low contrast emulsion is sensitive to green light. If a yellow filter is used, the result will be low contrast as it will block blue light and allow the low contrast emulsion to be exposed. A mix of these two filters makes up the range of variable contrast filters, numbered 00 (representing low contrast) to 5 (representing high contrast). The device provided in the present disclosure makes use of this type of photo paper and filters in order to control contrast manually, and intuitively without necessity for major adjustments of the image on LCD panel itself.

Apparatus 100 may also comprise an additional electronic unit 120, which may comprise electronic components such as at least one universal serial bus (USB) ports 126, a hard drive 128, and other supporting components 130. The additional electronic unit 120 can be electrically connected with LCD panel 106 through electronic panel 122 and wires 124. Electronic unit 120 can be placed outside or inside the additional housing 150, which is physically connected with housing 102.

Figure 2:
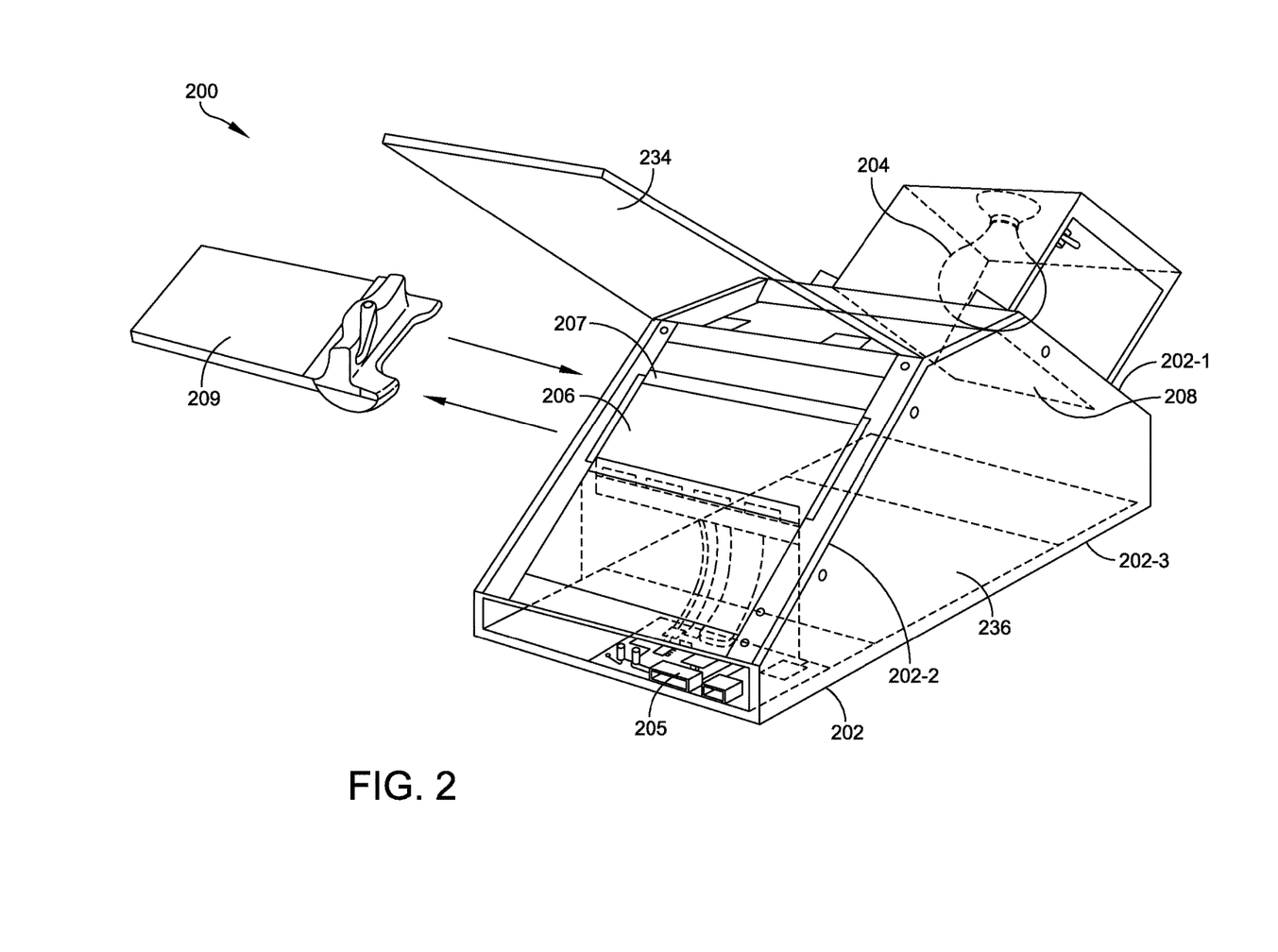
FIG. 2 illustrates another exemplary apparatus and resulting system for developing a photo from a digital image on a LCD panel in accordance with some embodiments.
Figure 3:
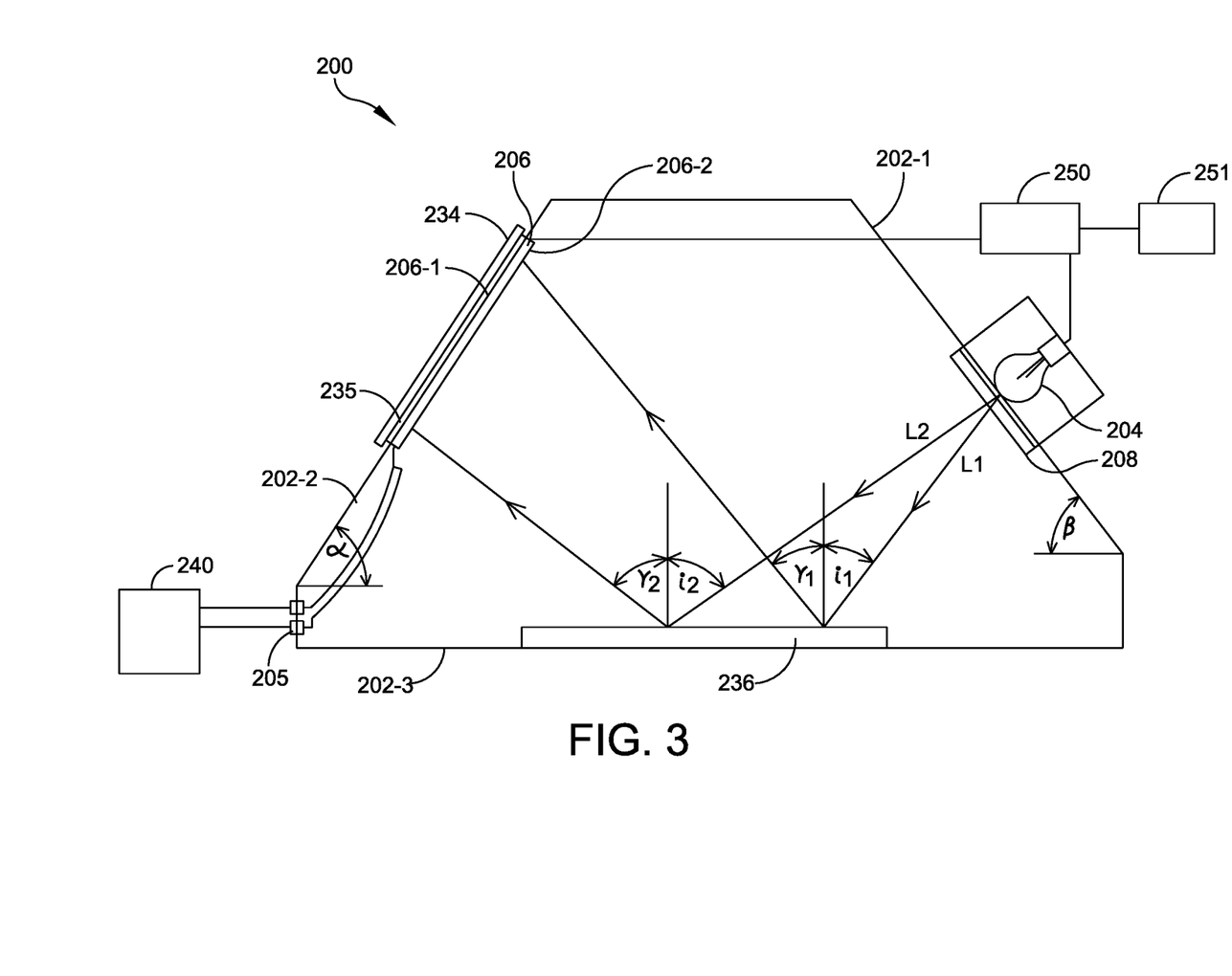
FIG. 3 is a sectional view of the exemplary apparatus and the system of FIG. 2 in some embodiments.

Referring to FIGS. 2 and 3, another exemplary apparatus 200 and resulting system are illustrated, for developing a photographic image from a digital image on a LCD panel 206 in accordance with some embodiments. FIG. 3 is a sectional view of exemplary apparatus 200.

In some embodiments, apparatus 200 comprises a housing 202, a light source 204 and a LCD panel 206. As shown in FIGS. 2 and 3, housing 202 may have a first wall 202-1, a second wall 202-2, and a bottom wall 202-3. In some embodiments, the first wall 202-1 and the second wall 202-2 are two slanted (or angled) side walls facing each other, and are oriented at an angle (e.g., α, β as shown in FIG. 3, respectively). The angles of α and β may be any suitable angles, and can be the same or different from each other. The angles of α and β are equal to each other in some embodiments. Housing 202 in apparatus 200 can be a prismatic console housing the components described herein. Such a console provides a sloped working surface. The first wall 202-1 and the second wall 202-2 may be one slanted side wall and one straight wall in some other embodiments.

In some embodiments, light source 204 is disposed on the first wall 202-1 of or inside housing 202 and configured to emit light to inside housing 202. Light source 204 can be any suitable source, for example, an incandescent bulb as shown in FIGS. 2 and 3. In some embodiments, an incandescent bulb of 45 watts is used.

LCD panel 206 has a front side 206-1 and a back side 206-2, and is disposed on the second wall 202-2 or inside housing 202. LCD panel 206 can be any suitable LCD panel including but not limited to a transmissive LCD panel. LCD panel 206 serves as the surface for the presentation of a photographic image from a digital source. LCD panel 206 is configured to display a digital image on the front side 206-1 upon illumination of the light toward the back side 206-2 and to expose a photographic media 235 disposed in close proximity to or contacting the front side 206-1 of LCD panel 206.

Different LCD panels can be used. In some embodiments, a part of a commercially available LCD panel, which generally has an enclosure with backlights, is used. The enclosure with backlights can be is removed, and the remaining glass LCD panel is used. The glass LCD panel may contain a circuit board and other electronic components. The circuit board may have a male LVDS (low-voltage differential signaling) cable output, which is then connected to an LCD driver board. An exemplary LCD panel 206 is manufactured by LG Display (model: LG LP101WH1 model, with native resolution of 1366×768, and approximately 150 pixels per inch, ppi). Another exemplary panel is from AU Optronics (model: B101UAN02, with a resolution of 1920×1200, or about 220 ppi, approximately 9 inches in the horizontal dimension). A resolution of 240 pixels per inch (ppi) or higher, for example, 260 ppi, is preferred. An exemplary LCD panel is from LG Display (model: LG LP097QX1-SPA1 providing over 260 ppi).

In some embodiments, apparatus 200 further comprises a filter slot 208 for an optical filter 220 disposed between light source 204 and LCD panel 206. Optical filter 220 is configured to filter out unwanted wavelength and provide a pre-determined range of wavelength of the light. The pre-determined range of wavelength can be of any suitable color range. Optical filter 210 can be any suitable filter, including but are not limited to, a contrast-adjusting plastic filter such as a polycarbonate dye filter and a colored gel filter. Optical filter 220 is used to limit the spectrum transmitted by light source 204 in order to control the range of tones to be recorded on a photographic paper. Optical filter 220 be used in conjunction with variable contrast paper, and can be of different sizes. How an optical filter be used in conjunction with variable contrast paper is described in apparatus 100 comprising optical filter 110. Optical filter 220 is used to set the black point of the photographic image to be developed while light exposure time is used to control the highlights in some embodiments.

Apparatus 200 may also comprise a mirror 236, which is placed inside housing 202 and optically between light source 204 and LCD panel 206. For example, mirror 236 is disposed horizontally over or on the bottom wall 202-3 of housing 202. Mirror 204 is configured to reflect the light from light source 204 to the back side 206-2 of LCD panel 206. Mirror 204 is placed in a fixed location so that the intensity and angle of the light reaching LCD panel 206 can be controlled.

In some embodiments, light source 204, mirror 236, and LCD panel 206 are configured so that light beams (or lines) from the light source at different angles have substantially identical optical pathways from the light source 204 to the back side 206-2 of LCD panel 206, according to the law of reflection. For example, as illustrated in FIG. 3, a light beam $L_1$, having a lower angle of incidence $i_1$ and angle of reflection $r_1$, travels at a shorter path from light source 204 and mirror 236 but a longer path from mirror 236 to the back side 206-2 of LCD panel 206. A light beam $L_2$, having a higher angle of incidence $i_2$ and angle of reflection $r_2$, travels at a longer path from light source 204 and mirror 236 but a shorter path from mirror 236 to the back side 206-2 of LCD panel 206. However, these two light beams have the same total optical pathways from light source 204 to LCD panel 206. Such a configuration can provide uniform illumination of LCD panel 206 with uniform distribution of light intensity, and thus provides uniform exposure, and quality of photographic images to be developed. The position and orientation of light source 204, or mirror 236, or both may be freely adjustable in some other embodiments.

Examples of suitable photographic media 235 include but are not limited to a photographic paper, an instant photographic film and any other suitable light sensitive and recordable media. In some embodiments, photographic media 235 is a chemically developable photographic paper, for example, a silver halide based paper. The photographic paper can directly contact the front side 206-1 of LCD panel 206. A plate 234 is mechanically connected on housing 202. Such a plate 234 is configured to press photographic media 235 against the front side of LCD panel 206. The recordable media 235 is held in contact with the LCD image presentation surface (i.e. the front surface of LCD panel 206) via a hinged pressure plate 234.

In some embodiments, apparatus 200 also comprises a slot 207 on the second wall 202-2 of housing 202. Slot 207 is configured to install an instant photographic film pack 209 on the front side 206-1 of LCD panel 206.

A computer 240 can be also disposed on one wall of or outside housing 202, and connected with LCD panel 206. Computer 240 is configured to display, process and provide a digital image to LCD panel 206. A user can access to the computer 240 to input and edit a digital image. Presentation of photographic images can be made through an electronic interface board 205, which is compatible with the common video interface standards (e.g., VGA, HDMI). In some embodiments, at least one control 250 is connected to at least one of light source 204 and LCD panel 206. The at least one control 250 can be connected with a power 251, and is used to adjust one of an intensity of the light and a time period of exposure. In some embodiments, computer 240 is optional, and LCD panel 206 can be used to preview or edit an image.

Figure 4:
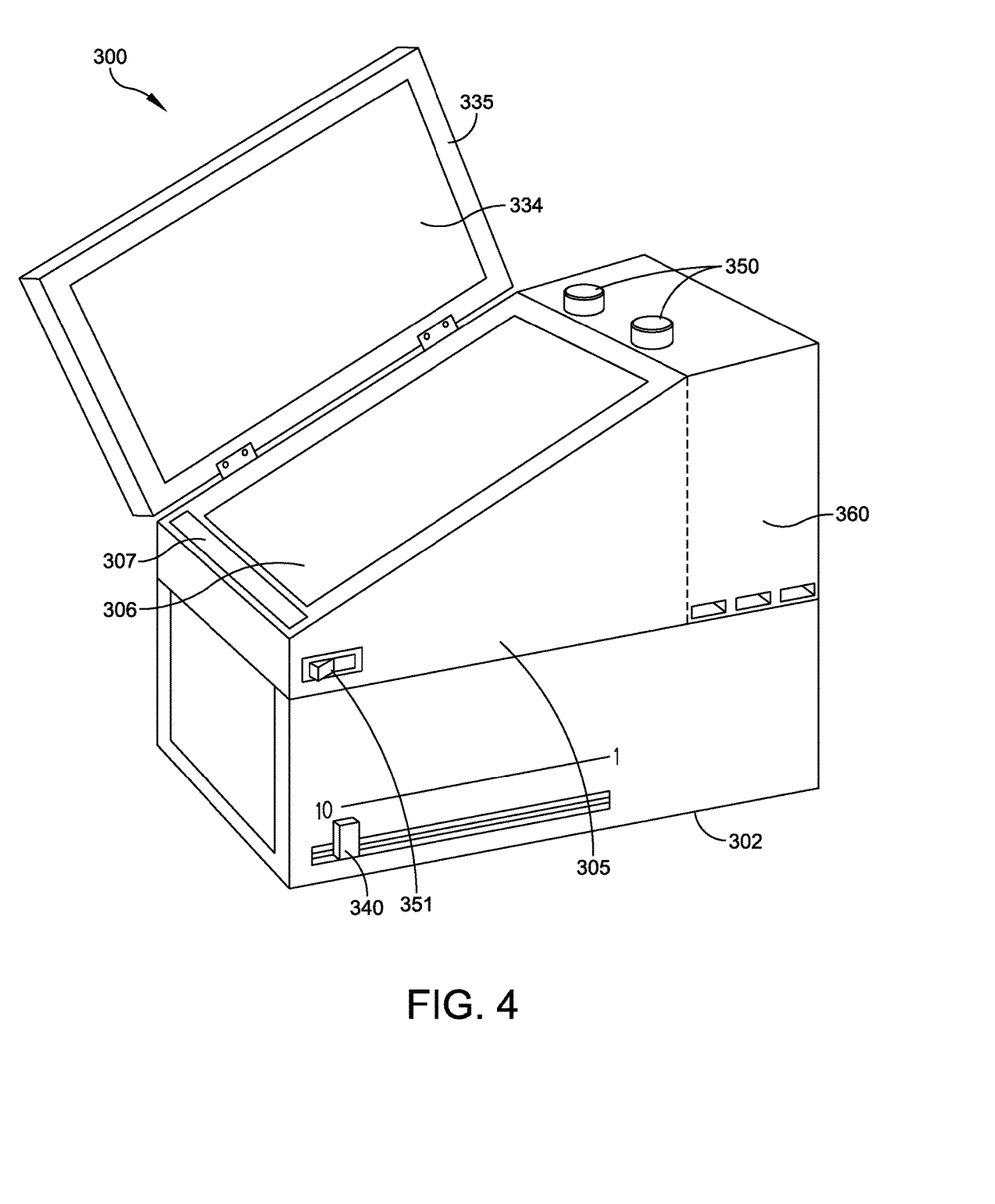
FIG. 4 is a perspective view illustrating an exemplary apparatus in accordance with some embodiments.
Figure 5:
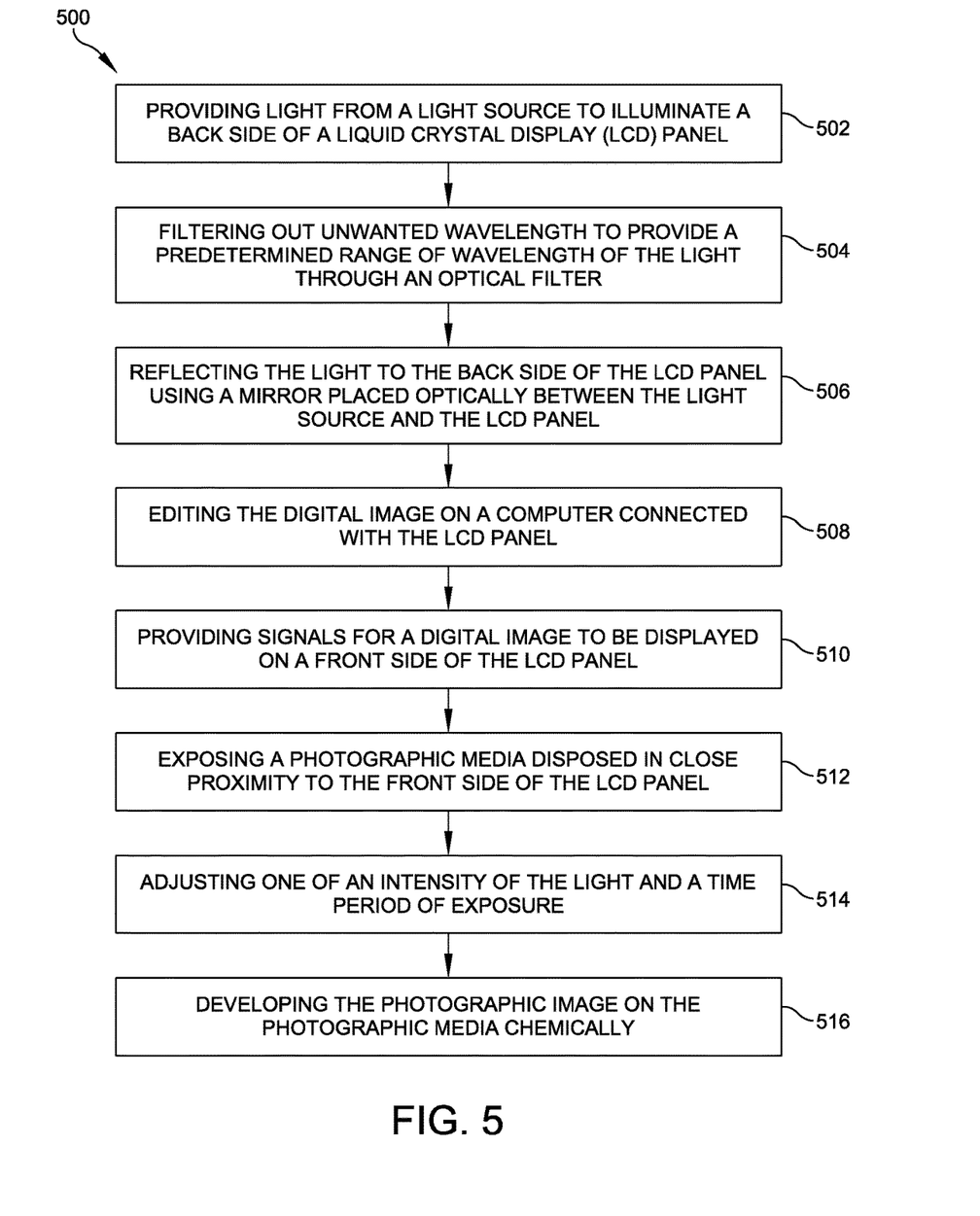
FIG. 5 is a flowchart illustrating an exemplary method for developing a photo from a digital image in accordance with some embodiments.

Referring to FIG. 4, an exemplary apparatus 300 is illustrated. Exemplary apparatus 300 has the structural elements of apparatus 200 as described. Only the external features are described for the purpose of illustration. Apparatus 200 may also have external features as described in apparatus 300. As shown in FIG. 4, apparatus 300 comprises a housing 302 and a LCD panel 306 (the same as LCD panel 206 as described in apparatus 200). Housing 302 may also comprise a main chamber 305 to house optical components including light source and mirror, and a back chamber 360 to house electronic components. Apparatus 300 can also comprise a pressure plate 334 installed on a hinged lid 335, which is used to press a photographic paper directly contacting LCD panel 206. A clip or a step 307 can be used to facilitate the process of holding the photographic paper. Apparatus 300 may also comprise a power switch 351, a control 340 for light intensity and at least one control 350 for controlling exposure time and other parameters on the walls of housing 302. One of the controls 350 can be a built-in timer for controlling the exposure time. The control 340 and controls 350 can be consolidated in one control panel in some embodiments.

The uses of apparatus (for example, exemplary apparatus 100 and 200) and resulting system can also be supplemented by computer hardware ports, downloadable software or other image manipulation tools. The present disclosure also provides the system for develop a photographic image. The system comprises the apparatus as described.

Referring to FIG. 5, an exemplary method 500 is used for developing a photo from a digital image in accordance with some embodiments. For brevity, method 500 is described herein with reference to the exemplary apparatus 200 described in FIGS. 2-3. Method 500 can be used in any other inventive apparatus and systems. The steps are not limited to any specific sequence, unless expressly indicated otherwise. A suitable may not necessarily comprise all the following steps. A suitable combination may comprise some or all the following steps.

At step 502, a light from a light source 204 is provided to illuminate a back side of a liquid crystal display (LCD) panel 206.

At step 504, which is optional, an optical filer 220 can be used to filter out unwanted wavelength to provide a predetermined range of wavelength of the light. Optical filter 220 can be disposed between light source 204 and LCD panel 206.

At step 506, in some embodiments, the light is reflected to the back side of the LCD panel 206 using a mirror 236 placed optically between light source 204 and LCD panel 206.

At step 508, which is an optional step, the digital image can be edited on a computer 240 connected with LCD panel 206 before step 512. Before step 508, a digital image in any suitable format is provided, for example, to computer 240, which displays the digital image. A user can access to computer 240 to edit the image. The image can be in any suitable format and of any resolution. A high resolution is preferred. The image can be of black-and-white, color or gray scale. Steps 508 may include a step of inverting the digital image. The step of inverting may include flipping the image horizontally. For example, an image displayed on the computer 240 may be in the same orientation as the image displayed on LCD panel 206. The photographic image exposed on the photographic media 235 in step 512 can be a mirror image of that in LCD panel 206. So the digital image displayed on computer 240 can be inverted on computer 240 before transferring to LCD panel 206.

At step 510, signals for a digital image to be displayed on a front side of LCD panel 206 are provided to the LCD panel 206. In some embodiments, the image on computer 240 can be inverted during providing such signals to LCD panel 206 so that the image displayed on LCD panel 206 is a mirror image of that displayed on computer 240. So the image exposed to a photographic media 235 at step 512 will be in the same orientation as the image on computer 240.

At step 512, a photographic media 235 disposed in close proximity to or contacting the front side of the LCD panel 206 is optically exposed. The photographic media 235 can be a photographic paper, an instant photographic film, any other suitable photosensitive paper or film. In some embodiments, photographic media 235 directly contacts the front side of LCD panel 206. The light intensity and exposure time can be controlled as described herein. When an incandescent bulb in the range of from 25 watts to 100 watts is used as a light source, the exposure time can be in the range of from 2 seconds to 20 seconds. In some embodiments, an incandescent bulb of 45 watts is used as a light source, and an exposure time of 8 seconds is used.

At step 514 of FIG. 5, in some embodiments, at least one control 250 is used to adjust an intensity of the light, a time period of exposure or any other processing parameters. Step 514 can be performed before or during step 512.

At step 516, the photographic image can be developed on the photographic media chemically, after the exposure step 512. For example, step 516 is performed using a developer and a fixer in a dark room in some embodiments. Step 516 can be used to develop black-and-white photos in dark room after exposing a silver-halide based photographic paper using LCD panel 206 in accordance with some embodiments. In addition to black-and-white photos, method 500 can be used to develop color photos or develop photos from instant photographic pack The methods and system described herein may be at least partially embodied in the form of computer-implemented processes and apparatus for practicing those processes. The disclosed methods may also be at least partially embodied in the form of tangible, non-transient machine readable storage media encoded with computer program code. The media may include, for example, RAMs, ROMs, CD-ROMs, DVD-ROMs, BD-ROMs, hard disk drives, flash memories, or any other non-transient machine-readable storage medium, or any combination of these mediums, wherein, when the computer program code is loaded into and executed by a computer, the computer becomes an apparatus for practicing the method. The methods may also be at least partially embodied in the form of a computer into which computer program code is loaded and/or executed, such that, the computer becomes an apparatus for practicing the methods. When implemented on a general-purpose processor, the computer program code segments configure the processor to create specific logic circuits. The methods may alternatively be at least partially embodied in a digital signal processor formed of application specific integrated circuits for performing the methods.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An apparatus for developing a photographic image, comprising:
   a housing;
   a light source disposed on a first wall of or inside the housing and configured to emit light to inside the housing;
   a liquid crystal display (LCD) panel having a front side and a back side, and disposed on a second wall or inside the housing, the LCD panel configured to display a digital image on the front side upon illumination of the light toward the back side and to expose a photographic media disposed in close proximity to or contacting the front side of the LCD panel; and
   a plate mechanically connected on the housing, and configured to press the photographic media against the front side of the LCD panel, wherein the photographic media is a photographic paper directly contacting the front side of the LCD panel.

2. The apparatus of claim 1, further comprising:
   a filter slot for an optical filter disposed between the light source and the LCD panel, the optical filter configured to filter out unwanted wavelength and provide a predetermined range of wavelength of the light.

3. The apparatus of claim 1, further comprising:
a mirror placed inside the housing and optically between the light source and the LCD panel, and configured to reflect the light from the light source to the back side of the LCD panel.

4. The apparatus of claim 1, wherein the photographic media is one of a photographic paper and an instant photographic film.

5. The apparatus of claim 1, further comprising:
a slot on the second wall of the housing and configured to install an instant photographic film pack on the front side of the LCD panel.

6. The apparatus of claim 1, further comprising:
a computer disposed on one wall of or outside the housing, connected with the LCD panel, and configured to display, process and provide a digital image to the LCD panel.

7. An apparatus for developing a photographic image, comprising:
a housing having a first wall, a second wall, and a bottom wall, wherein the first wall and the second wall are two slanted side walls facing each other;
a light source disposed on the first wall of or inside the housing and configured to emit light to inside the housing;
a liquid crystal display (LCD) panel having a front side and a back side, and disposed on the second wall the housing, the LCD panel configured to display a digital image on the front side upon illumination of the light toward the back side and to expose a photographic media disposed in close proximity to or contacting the front side of the LCD panel;
a filter slot for an optical filter disposed between the light source and the LCD panel, the optical filter configured to filter out unwanted wavelength and provide a pre-determined range of wavelength of the light;
a mirror placed inside the housing and optically between the light source and the LCD panel, and configured to reflect the light from the light source to the back side of the LCD panel; and
a plate mechanically connected on the housing, and configured to press the photographic media against the front side of the LCD panel, wherein the photographic media is a photographic paper directly contacting the front side of the LCD panel.

8. The apparatus of claim 7, further comprising:
a computer disposed on one wall of or outside the housing, connected with the LCD panel, and configured to display, process and provide a digital image to the LCD panel.

9. The apparatus of claim 7, wherein the photographic media is one of a photographic paper and an instant photographic film.

10. The apparatus of claim 7, further comprising:
a slot on the second wall of the housing and configured to install an instant photographic film pack on the front side of the LCD panel.

11. The apparatus of claim 7, further comprising:
a control connected to at least one of the light source and the LCD panel to adjust one of an intensity of the light and a time period of exposure.

12. The apparatus of claim 7, wherein the mirror is disposed over or on the bottom wall of the housing.

13. The apparatus of claim 7, wherein the light source, the mirror, and the LCD panel are configured so that light beams from the light source at different angles have substantially identical optical pathways from the light source to the back side of the LCD panel.

14. A method for developing a photographic image using the apparatus of claim 1, comprising:
providing light from the light source to illuminate a back side of the liquid crystal display (LCD) panel;
providing signals for a digital image to be displayed on a front side of the LCD panel; and
exposing a photographic media disposed in close proximity to or contacting the front side of the LCD panel.

15. The method of claim 14, further comprising:
editing the digital image on a computer connected with the LCD panel before the step of providing signals for the digital image to be displayed on the front side of the LCD panel.

16. The method of claim 14, further comprising:
filtering out unwanted wavelength to provide a pre-determined range of wavelength of the light through an optical filter disposed between the light source and the LCD panel.

17. The method of claim 14, further comprising:
reflecting the light to the back side of the LCD panel using a mirror placed optically between the light source and the LCD panel.

18. The method of claim 14, further comprising:
adjusting one of an intensity of the light and a time period of exposure.

19. The method of claim 14, wherein the photographic media is one of a photographic paper and an instant photographic film.

20. The method of claim 14, wherein the photographic media directly contacts the front side of the LCD panel.

21. The method of claim 14, further comprising:
developing the photographic image on the photographic media chemically after the step of exposing a photographic media disposed in close proximity to the front side of the LCD panel.

22. The method of claim 21, wherein the step of developing the photographic image on the photographic media chemically is performed using a developer and a fixer in a dark room.

* * * * *